(12) United States Patent
Tatsumi et al.

(10) Patent No.: US 8,690,997 B2
(45) Date of Patent: Apr. 8, 2014

(54) TWO-SIDED ATTRACTION STRUCTURE, EXHIBITING OR INDICATING APPARATUS USING SAME, DUST COLLECTING APPARATUS, AND PLANT GROWING APPARATUS

(75) Inventors: Yoshiaki Tatsumi, Kawasaki (JP); Hiroshi Fujisawa, Nara (JP); Megumu Kawae, Kawasaki (JP)

(73) Assignee: Creative Technology Corporation, Tokyo (JP)

( * ) Notice: Subject to any disclaimer, the term of this patent is extended or adjusted under 35 U.S.C. 154(b) by 505 days.

(21) Appl. No.: 13/119,347

(22) PCT Filed: Sep. 10, 2009

(86) PCT No.: PCT/JP2009/065837
§ 371 (c)(1),
(2), (4) Date: Mar. 16, 2011

(87) PCT Pub. No.: WO2010/032676
PCT Pub. Date: Mar. 25, 2010

(65) Prior Publication Data
US 2011/0162526 A1    Jul. 7, 2011

(30) Foreign Application Priority Data
Sep. 17, 2008    (JP) .................................. 2008-237994

(51) Int. Cl.
*B03C 3/47*    (2006.01)

(52) U.S. Cl.
USPC ........... 96/69; 40/463; 40/902; 47/1.3; 96/80; 96/86; 96/87; 96/99

(58) Field of Classification Search
USPC ........ 96/69, 80, 86, 87, 99; 47/1.3; 40/1, 463, 40/465, 902; 361/225–235
See application file for complete search history.

(56) References Cited

U.S. PATENT DOCUMENTS 2,974,747 A * 3/1961 Coolidge, Jr. et al. ............. 96/69
4,234,324 A * 11/1980 Dodge, Jr. ......................... 96/99
(Continued)

FOREIGN PATENT DOCUMENTS

CN    1031171 A    2/1989
JP    1-293149 A * 11/1989 ........................ 96/99
(Continued)

OTHER PUBLICATIONS

International Preliminary Report on Patentability issued on Jan. 7, 2011 in corresponding International Application PCT/JP2009/065837 (with English translation).
International Search Report issued on Dec. 22, 2009 in corresponding International Application PCT/JP2009/065837.
English translation of International Preliminary Report on Patentability (PCT/IB/338 and PCT/IPEA/409) mailed on Apr. 14, 2011 in International Application No. PCT/JP2009/065837

*Primary Examiner* — Richard L Chiesa
(74) *Attorney, Agent, or Firm* — Birch, Stewart, Kolasch & Birch, LLP

(57) ABSTRACT

A two-sided attraction structure including an electrostatic chuck portion (2) and a power supply portion (5), the electrostatic chuck portion (2) including a dielectric member (3) in a plate-like shape, which is made of an insulating material and has a front side and a back side, and an internal electrode (4) mounted into the dielectric member, the front side and the back side of the dielectric member each serving as an attraction surface when voltage is applied to the internal electrode (4), the power supply portion (5) applying the voltage to the internal electrode, of the electrostatic chuck portion (2), in which the power supply portion (5) includes a solar cell (6) and a voltage boost circuit (7) for boosting power generated by the solar cell (6).

6 Claims, 4 Drawing Sheets

(56) References Cited

U.S. PATENT DOCUMENTS

| | | | |
|---|---|---|---|
| 4,266,088 A * | 5/1981 | Candor | 136/206 |
| 4,354,861 A * | 10/1982 | Kalt | 96/69 |
| 5,464,456 A * | 11/1995 | Kertz | 47/1.3 |
| 5,766,318 A * | 6/1998 | Loreth et al. | 96/69 |
| 5,964,926 A * | 10/1999 | Cohen | 96/15 |
| 5,993,521 A * | 11/1999 | Loreth et al. | 96/69 |
| 6,117,216 A * | 9/2000 | Loreth | 96/62 |
| 6,914,540 B2 * | 7/2005 | Gongolas | 340/908.1 |
| 7,101,423 B2 * | 9/2006 | Lersch et al. | 96/68 |
| 2006/0227486 A1 * | 10/2006 | Kim et al. | 361/120 |
| 2012/0090228 A1 * | 4/2012 | Toyoda et al. | 47/1.3 |

FOREIGN PATENT DOCUMENTS

| | | |
|---|---|---|
| JP | 2-30718 U | 2/1990 |
| JP | 6-18496 B2 | 3/1994 |
| JP | 6-19345 Y2 | 5/1994 |
| JP | 6-37886 U | 5/1994 |
| JP | 9-294940 A | 11/1997 |
| JP | 2004-158789 A | 6/2004 |
| JP | 2008-164194 A | 7/2008 |

\* cited by examiner (a)          (b)

TWO-SIDED ATTRACTION STRUCTURE, EXHIBITING OR INDICATING APPARATUS USING SAME, DUST COLLECTING APPARATUS, AND PLANT GROWING APPARATUS

TECHNICAL FIELD

The present invention relates to a two-sided attraction structure, which has an electrostatic chuck function and can be employed for various uses. The present invention also relates to an exhibition/information apparatus, a dust collecting apparatus, and a plant growing apparatus, which employ the two-sided attraction structure.

BACKGROUND ART

For example, when information, such as a product illustration for an exhibit, is displayed in an exhibition hall exhibiting products or the like, the following are performed because the information cannot be attached directly to a wall, a pillar, or the like of the hall. In a case where there are partitions provided for respective exhibitors, the information is fixed with an adhesive tape or the like by utilizing the partition. On the other hand, in a case where there is no partition or the like, a notice board is brought in near the exhibit in the hall, and the information is displayed on the notice board. However, if the information is displayed through such methods, there occur various problems, such as the remains of the adhesive tape on the partition, and reduced space in the hall due to the notice board thus brought in.

Further, for example, in the case of displaying information outdoors temporarily, such as a direction guide for giving test takers directions to a test site at university or the like, typically, a simple signboard is prepared, and the displaying of the information is performed utilizing a gatepost, an outer wall of a building, a tree, a simple stake, or the like at a key location. However, it is troublesome to keep the prepared signboard in storage, and hence the fact is that the preparation and discarding of signboards are repeated every year. Thus, the displaying of information material through such a method poses various problems including wasting of wood etc. and efforts used therefor.

Further, for example, in a case where ventilation is provided indoors by introducing outside air indoors in a building like a house, there is provided a dust-collecting/ventilation system including: a ventilation unit for supplying purified outside air to respective indoor rooms and collecting air in the respective rooms to thereby discharge the collected air outdoors; and a dust collecting apparatus connected to an outside-air inlet of the ventilation unit, for collecting powder contaminants, such as dust and pollen, in the outside air introduced from the outside-air inlet. However, in the case of a conventional dust collecting apparatus used in the dust-collecting/ventilation system of this kind, if the dust collecting apparatus is a large-size apparatus, such as a cyclone dust collecting apparatus (Patent Literature 1), it is difficult to secure a set-up space therefor, and also, maintenance of filters imposes a significant load. Further, if the filters are such simple dust collecting filters that are set up at the outside-air inlet, there occurs a problem that powder contaminants cannot be collected sufficiently because of insufficiency of a dust collecting function.

In addition, in the case of such a dust-collecting/ventilation system that is used in a building, the around-the-clock (all-day) operation may be needed depending on the use of the building or the surrounding environment thereof. In this case, apart from the problem of the dust collecting apparatus itself, there is also another problem of how energy for causing the dust collecting apparatus to function is secured.

Further, like the above-mentioned cases of the exhibition/information apparatus and the dust collecting apparatus, there are similar problems with a plant growing apparatus such as a seedling raising box, which is set up outdoors and is used for raising plants like rice seedlings, bean sprouts, and radish sprouts, and fungi like *Flammulina velutipes* and Chinese mushroom.

CITATION LIST

Patent Literature

[PTL 1] JP 2008-164194 A

SUMMARY OF INVENTION

Technical Problem

To address this, the inventors of the present invention focused on the attraction function of the electrostatic chuck for attracting/holding a semiconductor substrate, which is widely used in an ion implantation apparatus, an ion doping apparatus, a plasma immersion apparatus, and the like in a semiconductor manufacturing process, and also focused on a self-generation function of a solar cell. As a result of intensive studies made to solve various problems posed by the exhibition/information apparatus, the dust collecting apparatus, the plant growing apparatus, and the like, the inventors of the present invention have developed a two-sided attraction structure in which: the electrostatic chuck has a two-sided attraction function; the two-sided attraction function of the electrostatic chuck is operated utilizing the self-generation function of the solar cell; with this, one of the attraction surfaces is detachably attracted onto a target attraction surface made of an electrically insulating material and the other of the attraction surfaces is caused to provide an intended function; and the solar cell supplies energy necessary therefor. This has led to the completion of the present invention.

Therefore, an object of the present invention is to provide a two-sided attraction structure, which can be used repeatedly with remarkable ease, thereby being free from the problem of material wasting or the like, is also free from the problem of energy, and is applicable for various uses such as an exhibition/information apparatus, a dust collecting apparatus, and a plant growing apparatus.

Further, another object of the present invention is to provide an exhibition/information apparatus formed by employing the above-mentioned two-sided attraction structure, which can be set up with ease at various places such as a gatepost and an outer wall of a building, is free from the problem of energy used therefor, and can be used repeatedly.

Further, still another object of the present invention is to provide a dust collecting apparatus formed by employing the above-mentioned two-sided attraction structure, which has an excellent dust collecting function, allows the securing of a set-up space therefor and maintenance to be performed with ease, and is also free from the problem of energy.

Further, still another object of the present invention is to provide a plant growing apparatus formed by employing the above-mentioned two-sided attraction structure, which is capable of applying, to seeds and seedlings, an electric stimulus for promoting the growth of the seeds and seedlings that are germinating or growing in a seedling raising box or the like.

Solution to Problem

Therefore, the present invention provides a two-sided attraction structure, comprising: an electrostatic chuck portion, and a power supply portion, wherein the electrostatic chuck portion comprises a dielectric member in a plate-like shape, which is made of an insulating material and has a front side and a back side each of which serves as an attraction surface when voltage is applied to the internal electrode, and an internal electrode mounted into the dielectric member, wherein the power supply portion applies the voltage to the internal electrode of the electrostatic chuck portion, and wherein the power supply portion includes: a solar cell, and a voltage boost circuit for boosting power generated by the solar cell.

Further, the present invention also provides an exhibition/information apparatus, which includes display means for exhibition/information formed by employing the above-mentioned two-sided attraction structure. Further, the present invention also provides a dust collecting apparatus, which includes dust collecting means formed by employing the above-mentioned two-sided attraction structure. Further, the present invention also provides a plant growing apparatus, which includes electric stimulation means formed by employing the above-mentioned two-sided attraction structure, for applying, by means of an electric field, an electric stimulus to a plant when the voltage is applied.

In the present invention, it is only necessary that the electrostatic chuck portion constituting the two-sided attraction structure include at least the dielectric member in a plate-like shape, which is made of an insulating material and has a front side and a back side, and the internal electrode mounted into the dielectric member, and that the front side and the back side of the dielectric member each serve as the attraction surface when voltage is applied to the internal electrode. Thus, the electrostatic chuck portion may be of the bipolar type, in which the electrostatic chuck portion includes a positive electrode and a negative electrode as the internal electrode, or may be of the unipolar type, in which the electrostatic chuck portion includes only the positive (negative) electrode as the internal electrode, and the negative (positive) side is grounded. However, it is preferred that the electrostatic chuck portion be of the bipolar type because the bipolar type is advantageous in providing higher two-sided attraction performance, and also the grounding is not necessary.

The thickness of the electrostatic chuck portion may be selected as appropriate depending on the use of the two-sided attraction structure. However, from the viewpoint of handling and durability, the electrostatic chuck portion is preferably formed into a sheet-like shape or a thin plate-like shape having a thickness of 0.2 mm or larger and 3 mm or smaller, and more preferably, a thickness of 0.5 mm or larger and 1 mm or smaller. If the thickness of the electrostatic chuck portion is smaller than 0.2 mm, there occur problems of compromising handleability and durability because the electrostatic chuck portion is too thin. On the other hand, if the thickness of the electrostatic chuck portion is larger than 3 mm, there occur problems of an increased weight and reduced handleability.

Further, as for the dielectric member of the electrostatic chuck portion, a synthetic resin or a ceramic is generally used. Depending on the use of the two-sided attraction structure, the entirety of the dielectric member may be formed of a synthetic resin or a ceramic. Alternatively, with the internal electrode mounted inside being as a boundary, one attraction surface side of the dielectric member may be formed of a synthetic resin while the other attraction surface side thereof may be formed of a ceramic. For example, in a case where the use of the two-sided attraction structure takes place in an atmosphere in which temperature is normal and humidity is not so high, the entirety of the dielectric member is preferably formed of a synthetic resin. Examples of such case include: a case in which the two-sided attraction structure is used indoors; a case in which the two-sided attraction structure is used outdoors but at a place where a roof or the like is provided; and a case in which the two-sided attraction structure is used in a vacuum. On the other hand, in a case where the use of the two-sided attraction structure takes place in a place where temperature and humidity are high, in a place where metal waste, a corrosive chemical, or the like exists, or in a place where a gas is handled, the entirety of the dielectric member is preferably formed of a ceramic. Examples of such case include: a case in which the two-sided attraction structure is used outdoors with no roof or the like provided; a case in which the two-sided attraction structure is used in a factory; and a case in which the two-sided attraction structure is used in a vacuum around a place where plasma or the like is generated. Further, even in the case where the use of the two-sided attraction structure takes place in the latter case, if the two-sided attraction structure is to be attached onto a wall or the like where only one side thereof has a stable atmosphere, one attraction surface side is preferably formed of a synthetic resin while the other attraction surface side is formed of a ceramic.

In particular, in a case where the two-sided attraction structure is used for, for example, the exhibition/information apparatus, the dust collecting apparatus, the plant growing apparatus, or the like, it is required that the weight of the two-sided attraction structure itself be reduced. Accordingly, as for the electrostatic chuck portion, the dielectric member thereof is preferably formed into a resin sheet made of a synthetic resin, and more preferably, into a flexible resin sheet, and the total thickness of the electrostatic chuck portion including the internal electrode is preferably 0.2 mm or larger and 3 mm or smaller. In particular, if the dielectric member is formed into a flexible resin sheet and the total thickness of the electrostatic chuck portion is set to 0.2 mm or larger and 0.5 mm or smaller, the electrostatic chuck portion becomes easy to deform as a whole along a surface to which the two-sided attraction structure is to be attached. Therefore, even if a portion to which the two-sided attraction structure is to be attached is curved or bent, the two-sided attraction structure can be attached thereto with ease.

Further, in the present invention, it is only necessary that the power supply portion constituting the two-sided attraction structure include at least the solar cell for generating power by converting optical energy into electric energy, and the voltage boost circuit for boosting the power generated by the solar cell to voltage necessary for providing the two-sided attraction function to the attraction surfaces on the both sides of the electrostatic chuck portion when supplied thereto. Depending on the use of the two-sided attraction structure, the solar cell or the voltage boost circuit to be used may be selected as appropriate from among already well-known devices.

Then, in a case where the two-sided attraction structure is used for, for example, the exhibition/information apparatus, the dust collecting apparatus, the plant growing apparatus, or the like, and the solar cell thereof utilizes the sunlight in the daytime, the power supply portion is preferably provided with charging means, such as a battery or a large-capacity capacitor, for storing the power generated by the solar cell, so that the two-sided attraction function of the two-sided attraction structure may be provided even when the power generation function of the solar cell is decreased, such as in the nighttime, in the event of rain, or the like. Such charging means varies depending on the use of the two-sided attraction structure. For example, in a case where the two-sided attraction structure is used as the display means for exhibition/information of the exhibition/information apparatus, the energy capacity of the charging means is preferably 200 mWh or larger so that the two-sided attraction structure can exert a predetermined attraction force for two days.

Further, the power supply portion may be provided with a power switch for power-ON/OFF so that the power supply can be made to the two-sided attraction structure or can be cut off when needed. For example, in the case where the two-sided attraction structure is used as the display means for exhibition/information in the exhibition/information apparatus, the power switch of the power supply portion may be turned ON/OFF at the time of replacing information or the like attracted onto the display means. Further, for example, in the case where the two-sided attraction structure is used as the dust collecting means of the dust collecting apparatus, the power switch may be turned ON/OFF at the time of replacing a sheet of filter paper detachably attracted onto the attraction surface of the electrostatic chuck portion.

Further, in the present invention, it is only necessary that the electrostatic chuck portion and the power supply portion constituting the two-sided attraction structure be connected to each other so that power is supplied from the power supply portion to the electrostatic chuck portion. The electrostatic chuck portion and the power supply portion may be formed integrally or may be located at the same place. In addition, the electrostatic chuck portion and the power supply portion may be connected to each other with a relatively long connection cable, and the electrostatic chuck portion may be set up at a convenient place therefor while the power supply portion may be set up at a convenient place for the solar cell to generate power. Further, as may be necessary, the solar cell and the voltage boost circuit constituting the power supply portion may be formed integrally, may be located at the same place, or also may be connected to each other with a connection cable so as to be located with a space therebetween.

As for the display means for exhibition/information that is formed by employing the two-sided attraction structure of the present invention and is installed in the exhibition/information apparatus, the two-sided attraction structure itself may be used as the display means, in which: one of the attraction surfaces thereof is attracted and fixed at a target set-up place, such as a gatepost formed of a dielectric material having an electrical insulation property like a ceramic or a synthetic resin, an outer wall of a building, window glass, or a conventional notice board, wall, or the like formed of a metallic structure; and on the other attraction surface, information or the like that is temporarily displayed outdoors, such as a poster or a direction guide, may be attracted and fixed. Further, the two-sided attraction structure may be incorporated into a predetermined frame body for display or the like to thereby constitute the display means. Then, one of the attraction surfaces is attracted and fixed at the target set-up place, while the other attraction surface is caused to hold the frame body for display, and the frame body for display is caused to hold information or the like.

Further, in the case where the two-sided attraction structure is used as the display means of the exhibition/information apparatus as described above, the two-sided attraction structure may also be used as lighting or illumination for information or the like by utilizing the power from the power supply portion of the two-sided attraction structure.

Further, as for the dust collecting means that is formed by employing the two-sided attraction structure of the present invention and is installed in the dust collecting apparatus, the two-sided attraction structure itself may constitute the dust collecting means for providing the dust collecting function. Alternatively, by utilizing the two-sided attraction function of the two-sided attraction structure, the two-sided attraction structure may be attached to a surface of a support member having a predetermined shape to thereby constitute the dust collecting means. Further, in the two-sided attraction structure, a sheet of filter paper may be attracted onto the attraction surface for attracting powder contaminants, to thereby constitute the dust collecting means.

Further, as for the electric stimulation means that is formed by employing the two-sided attraction structure of the present invention, and is used for applying, by means of the electric field, the electric stimulus to a plant when the voltage is applied, for example, in a case where the plant growing apparatus includes a plurality of seedling raising boxes for raising seeds and seedlings that are germinating or growing, and a protective casing for accommodating those seedling raising boxes, the electric stimulation means may be formed into, for example, a resin board in a plate-like shape made of a synthetic resin or into a flexible resin sheet, and may be attracted onto a part or the whole of a side wall member and the lid member of the protective casing when used. Further, in the case of the flexible resin sheet, the electric stimulation means may be used in such a manner as to cover the protective casing from above.

Advantageous Effects of Invention

The two-sided attraction structure of the present invention is driven by the solar cell, and the front side and the back side thereof provide the two-sided attraction function. Therefore, the two-sided attraction structure of the present invention can be used repeatedly with remarkable ease, thereby being free from the problem of material wasting or the like, and is also free from the problem of energy. In addition, the two-sided attraction structure of the present invention can be put to a large number of uses, including the exhibition/information apparatus and the dust collecting apparatus.

Further, the exhibition/information apparatus of the present invention is driven by the solar cell, and is formed by employing the two-sided attraction structure for providing the two-sided attraction function on the front side and the back side thereof. Therefore, the exhibition/information apparatus of the present invention can be set up at various places, such as a gatepost and an outer wall of a building. In addition, the exhibition/information apparatus of the present invention is free from the problem of energy used therefor, and also can be used repeatedly.

Further, the dust collecting apparatus of the present invention is driven by the solar cell, and is formed by employing the two-sided attraction structure for providing the two-sided attraction function on the front side and the back side thereof. Therefore, the dust collecting apparatus of the present invention has an excellent dust collecting function, and allows the securing of a set-up space therefor and maintenance to be performed with ease. In addition, the dust collecting apparatus of the present invention is free from the problem of energy, and is thus remarkably useful as the dust collecting apparatus of the dust-collecting/ventilation system provided to a building like a house, for example. Moreover, the dust collecting apparatus of the present invention can be applied to a particle removing apparatus used in a processing chamber, a beam line, or the like of a semiconductor manufacturing apparatus.

Further, in the plant growing apparatus of the present invention, the electric stimulation means for applying, by means of the electric field, the electric stimulus to plants including seeds and seedlings to be raised, is formed of the two-sided attraction structure of the present invention, and is driven by the solar cell. Therefore, the plant growing apparatus of the present invention can be set up outdoors with ease, is free from the problem of energy used therefor, and can be used repeatedly.

DESCRIPTION OF EXAMPLES

Hereinbelow, with reference to examples illustrated in the attached drawings, specific description is given of preferred examples of a two-sided attraction structure of the present invention and an exhibition/information apparatus and a dust collecting apparatus which employ the same.

Example 1

Figure 1:
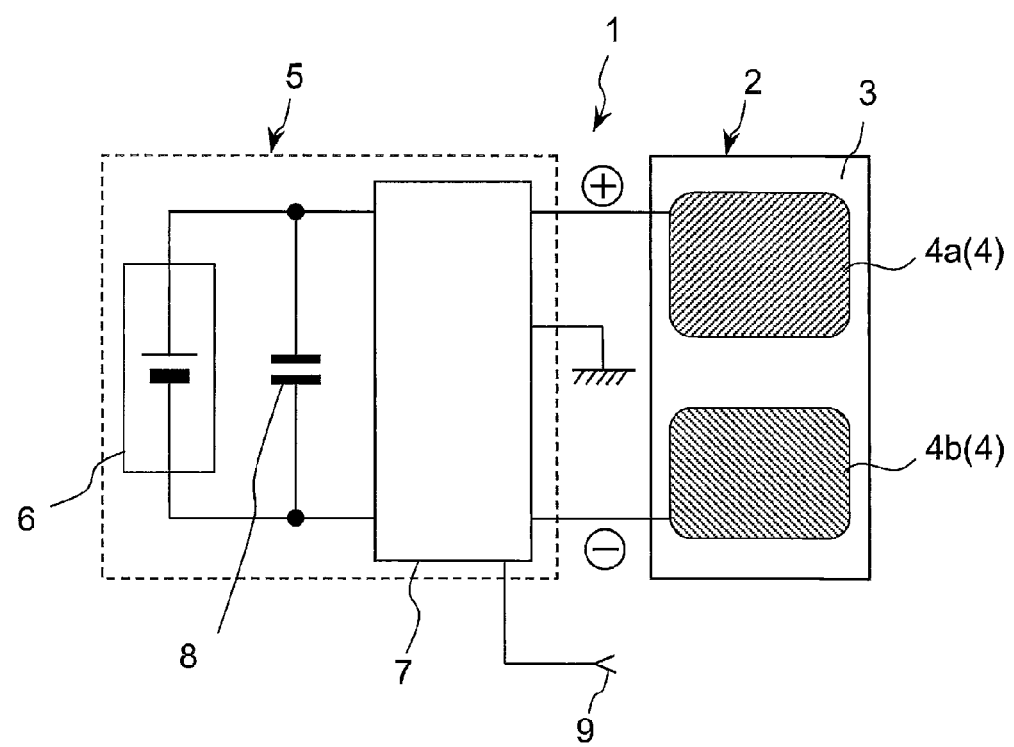
FIG. 1 is an explanatory view for describing a two-sided attraction structure adopted, as display means, to an exhibition/information apparatus of Example 1 of the present invention.
Figure 2:
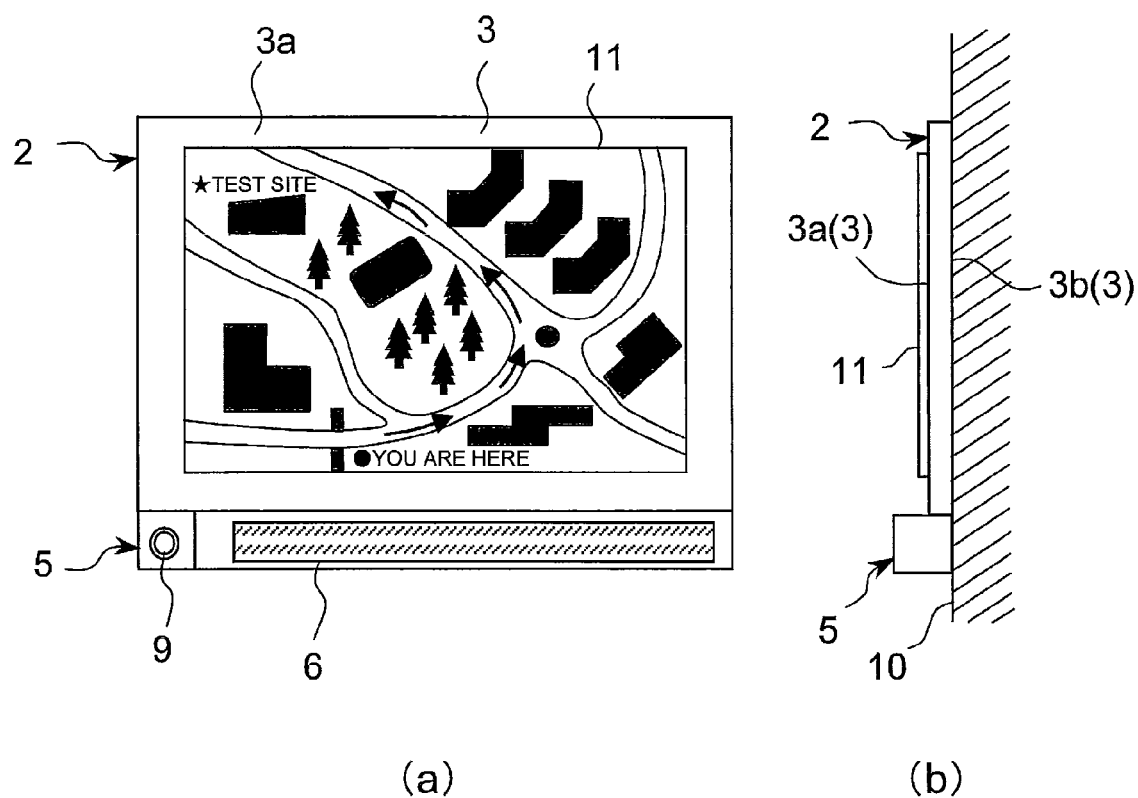
FIG. 2 are explanatory views including an explanatory plan view (FIG. 2(a)) and an explanatory side view (FIG. 2(b)) for describing the exhibition/information apparatus according to Example 1 of the present invention.

FIG. 1 and FIG. 2 illustrate an exhibition/information apparatus that uses a two-sided attraction structure 1 according to Example 1 of the present invention as display means for exhibition/information.

In the exhibition/information apparatus of Example 1, the two-sided attraction structure 1 serving as the display means includes an electrostatic chuck portion 2 and a power supply portion 5. The electrostatic chuck portion 2 includes a dielectric member 3 in a plate-like shape, which is made of an insulating material and has front and back sides, and an internal electrode 4 mounted into the dielectric member 3, and the front and back sides of the dielectric member 3 serve as attraction surfaces 3a and 3b, respectively, when voltage is applied to the internal electrode 4. The power supply portion 5 includes a solar cell 6 and a voltage boost circuit 7 for boosting power generated by the solar cell 6, and applies voltage to the internal electrode 4 of the electrostatic chuck portion 2.

The electrostatic chuck portion 2 of the two-sided attraction structure (display means) 1 has so-called bipolar electrostatic chuck structure in which a pair of a positive electrode layer 4a and a negative electrode layer 4b, which are made of copper and have the dimensions of 500 mm (length)×400 mm (width)×1 μm (thickness), are sandwiched as the internal electrode 4, while being spaced apart from each other by 5 mm, between two polyethylene resin sheets, which have the dimensions of 600 mm (length)×850 mm (width)×100 μm (thickness) and constitute the dielectric member 3, and those two polyethylene resin sheets and the pair of the positive electrode layer 4a and the negative electrode layer 4b made of copper are formed integrally through the intermediation of a pressure-sensitive adhesive sheet.

Note that, in Example 1, the internal electrode 4 is constituted of the pair of the positive electrode layer 4a and the negative electrode layer 4b, which are sandwiched while being spaced apart from each other by 5 mm and have substantially a rectangular shape. However, the positive electrode layer 4a and/or the negative electrode layer 4b may be formed in a predetermined pattern shape so that stronger gradient force may be generated with lower applied voltage to thereby obtain stronger attraction force on the attraction surfaces 3a and 3b formed on the front and back sides of the dielectric member 3 of the electrostatic chuck portion 2.

Further, in the exhibition/information apparatus of Example 1, the power supply portion 5 for applying voltage to the internal electrode 4 of the electrostatic chuck portion 2 includes, between the solar cell 6 and the voltage boost circuit 7, a large-capacity capacitor 8 having an energy capacity of 200 mWh, for storing power generated by the solar cell 6 so that the power may be supplied to the electrostatic chuck portion 2 even if the power generation capability of the solar cell 6 is temporarily stopped or decreased. Further, the voltage boost circuit 7 is provided with a power switch 9 for turning ON/OFF the power supply to the electrostatic chuck portion 2, thereby providing the attraction force to the front and back sides of the dielectric member 3 of the electrostatic chuck portion 2 or cutting off the attraction force.

Here, in the exhibition/information apparatus of Example 1, the electrostatic chuck portion 2 and the power supply portion 5 constituting the two-sided attraction structure 1 are formed integrally, but the electrostatic chuck portion 2 and the power supply portion 5 only need to be connected to each other so that the power may be supplied. The electrostatic chuck portion 2 and the power supply portion 5 may be connected to each other with a relatively long connection cable, and the electrostatic chuck portion 2 may be set up at a convenient place for exhibiting/displaying an exhibit or information, such as a poster, a painting, or a direction guide, whereas the power supply portion 5 may be set up at a convenient place for the solar cell 6 to generate power.

Thus, according to the exhibition/information apparatus of Example 1, first, in a state in which the power switch 9 is OFF, the display means constituted of the two-sided attraction structure 1 is positioned and arranged at a set-up place 10 onto which the electrostatic chuck portion 2 can be attracted, such as a university school gate made of a ceramic. Then, in this state, the power switch 9 is turned ON to supply power to the positive electrode layer 4a and the negative electrode layer 4b of the electrostatic chuck portion 2 from the solar cell 6 and the voltage boost circuit 7 of the power supply portion 5, thereby generating the attraction force on the attraction surface 3b on the back side of the dielectric member 3 of the electrostatic chuck portion 2. With this, the two-sided attraction structure 1 (display means) is attached to the set-up place, and then, on the attraction surface 3a on the front side of the dielectric member 3 of the electrostatic chuck portion 2, there is attached information 11, such as a direction guide to a test site for guiding students who are going to take university admission tests to the test site.

As long as there exists an object formed of a material on which the attraction force of the electrostatic chuck portion 2 acts, such as a plastic, a ceramic, window glass, or a conventional notice board or wall made of a metallic structure, the exhibition/information apparatus of Example 1 may be set up anywhere by using such an object. In addition, the exhibition/ information apparatus of Example 1 has the advantages of being able to be used repeatedly with remarkable ease, thereby being free from the problem of material wasting or the like, and also of being free from the problem of energy.

Example 2

Figure 3:
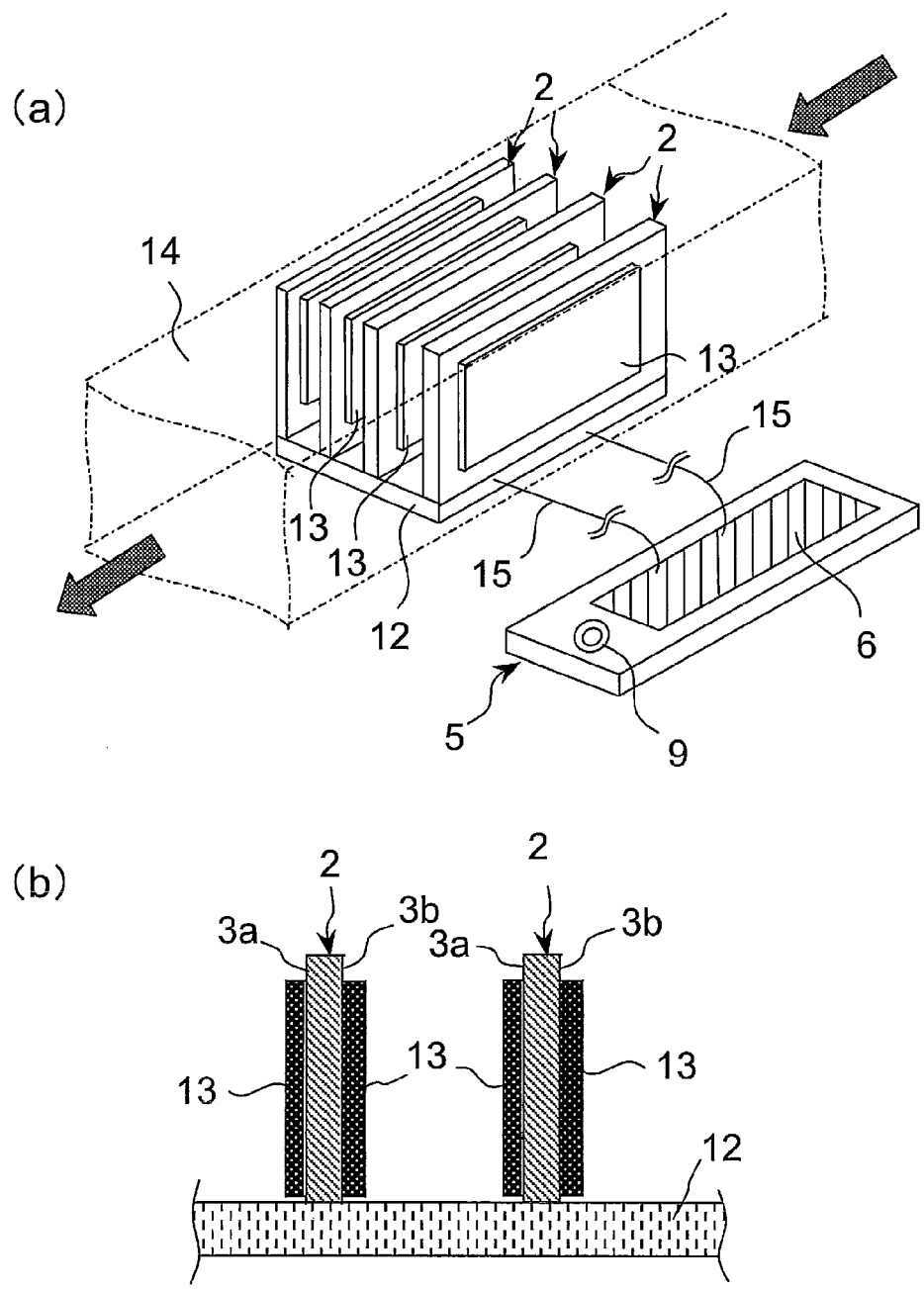
FIG. 3 are explanatory views including an explanatory perspective view (FIG. 3(a)) and an explanatory partially-enlarged view (FIG. 3(b)) for describing a dust collecting apparatus according to Example 2 of the present invention.

FIG. 3 illustrate a dust collecting apparatus that utilizes a two-sided attraction structure 1 according to Example 2 of the present invention as dust collecting means. For example, the dust collecting apparatus is used together with a ventilation unit (not shown) in a dust-collecting/ventilation system provided to a house or the like. Note that, the two-sided attraction structure 1 used in Example 2 is practically the same as that of Example 1 illustrated in FIG. 1, but has structure in which four electrostatic chuck portions 2 are connected in parallel to one power supply portion 5 (dust collecting means).

In the dust collecting means of Example 2, as illustrated in FIG. 3, the four electrostatic chuck portions 2 are provided upright on an upper surface of a support member 12 having a plate-like shape, thereby forming a dust collecting portion. Further, a sheet of filter paper 13 is detachably attached, by means of the attraction force of the electrostatic chuck portion 2, to each of the attraction surfaces 3a and 3b on the front and back sides of each of the electrostatic chuck portions 2 provided upright to the support member 12. Still further, the support member 12 is provided with mounting means (not shown) for detachably mounting the dust collecting portion of the two-sided attraction structure (dust collecting means) 1 in a duct 14 of the ventilation unit.

In the two-sided attraction structure (dust collecting means) 1 of Example 2, the power supply portion 5 is connected to the four electrostatic chuck portions 2 (dust collecting portion) by a relatively long connection cable 15, and at least the solar cell 6 of the power supply portion 5 is set up, for example, on a roof of the house so that the sunlight can be received easily.

Thus, according to the dust collecting apparatus of Example 2, when the ventilation unit of the dust-collecting/ventilation system is driven in a house or the like to take in outside air via the duct 14, the electrostatic chuck portions 2 of the two-sided attraction structure (dust collecting means) 1 set up in the duct 14 exert the attraction force via the sheets of filter paper 13 placed on the attraction surfaces 3a and 3b. With this, such powder contaminants as dust and pollen in the outside air introduced into the duct 14 are collected on the sheets of filter paper 13, which enables the outside air taken inside to be purified.

Then, when a relatively large amount of powder contaminants have accumulated on the sheets of filter paper 13 placed on the attraction surfaces 3a and 3b due to long-term usage, the four electrostatic chuck portions 2 (dust collecting portion) are removed from the duct 14 along with the support member 12, and then, the power switch 9 is turned OFF before the sheets of filter paper 13 are peeled off of the attraction surfaces 3a and 3b of each of the electrostatic chuck portions 2. Then, the power switch 9 is turned ON again to attach the sheets of filter paper 13 to the attraction surfaces 3a and 3b of each of the electrostatic chuck portions 2, and the four electrostatic chuck portions 2 (dust collecting portion) are mounted in the duct 14 through the intermediation of the support member 12.

According to the dust collecting apparatus of Example 2, there is practically no need for a set-up space or the like for the mounting of a large-size cyclone dust collecting apparatus or the like. In addition, it is easy to perform maintenance on the filters, and also, various kinds of powder contaminants can be collected easily and reliably by utilizing the attraction force of the electrostatic chucks.

Example 3

Figure 4:
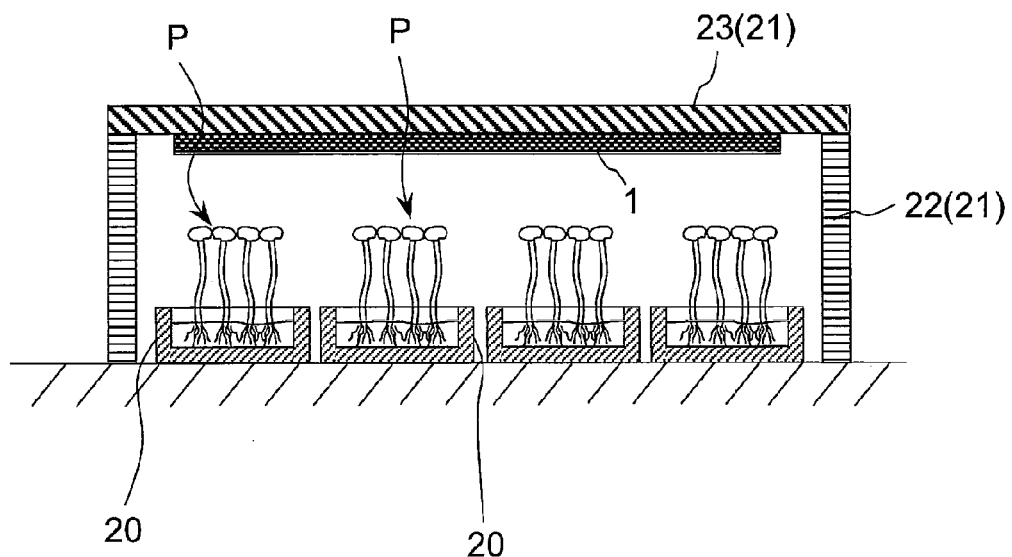
FIG. 4 is an explanatory view illustrating a test apparatus for a plant growing apparatus for producing radish sprouts according to Example 3 of the present invention.

FIG. 4 illustrates a test apparatus for a plant growing apparatus for producing radish sprouts according to Example 3 of the present invention. The test apparatus for the plant growing apparatus includes a plurality of seedling raising boxes 20 and a protective casing 21. The seedling raising box 20 accommodates absorbent cotton and water absorbed in the absorbent cotton, and is used for growing radish sprouts P, which have germinated from the sown seeds thereof, until the radish sprouts P become a predetermined size. The protective casing 21 includes a peripheral wall portion 22, which is provided upright around the plurality of seedling raising boxes 20 in such a manner that the height thereof is adjustable, and a lid member 23, which is placed on an upper edge of the peripheral wall portion 22, and serves to block light from an outside. On an inner surface side of the lid member 23 of the protective casing 21, there is attracted the two-sided attraction structure 1 having a plate-like shape, which functions as electric stimulation means for applying, by means of an electric field, an electric stimulus to sown seeds and seedlings to be raised in the seedling raising box 20.

In Example 3, the seeds for producing the radish sprouts P are sown into the absorbent cotton containing water in each of the seedling raising boxes 20. Further, as the plant length of the radish sprouts P that have germinated from the sown seeds becomes longer, the height of the peripheral wall portion 22 of the protective casing 21 is adjusted over time so that the tips of the radish sprouts P (top of plant length) are located within the area of the electric field generated by the two-sided attraction structure 1 functioning as the electric stimulation means.

The following plant growing test was conducted from August 20 to August 21 in 2008, and a comparison was made against Comparative Example. As the seedling raising boxes 20, there were used four plastic containers having the dimensions of 4 cm×6 cm×2 cm (depth). Further, as the protective casing 21, there was used a cardboard protective casing including the peripheral wall portion 22 of 20 cm long and 30 cm wide, whose height was adjustable from 3 cm to 10 cm, and the lid member 23 placed on an upper portion of the peripheral wall portion 22. Further, on the inner surface side of the lid member 23 of the protective casing 21, there was attracted the two-sided attraction structure 1 including the electrostatic chuck portion provided with carbon electrodes having an electrode width of 3 mm, a gap of 1 mm, and an overlapping portion of 1 mm. Then, voltages of ±900 V were constantly applied while a distance between the top of the plant length and the two-sided attraction structure 1 was maintained at 2 cm or smaller until the plant length of the radish sprouts P reached a predetermined size after the seeding. In Comparative Example, no voltage was applied.

Figure 5:
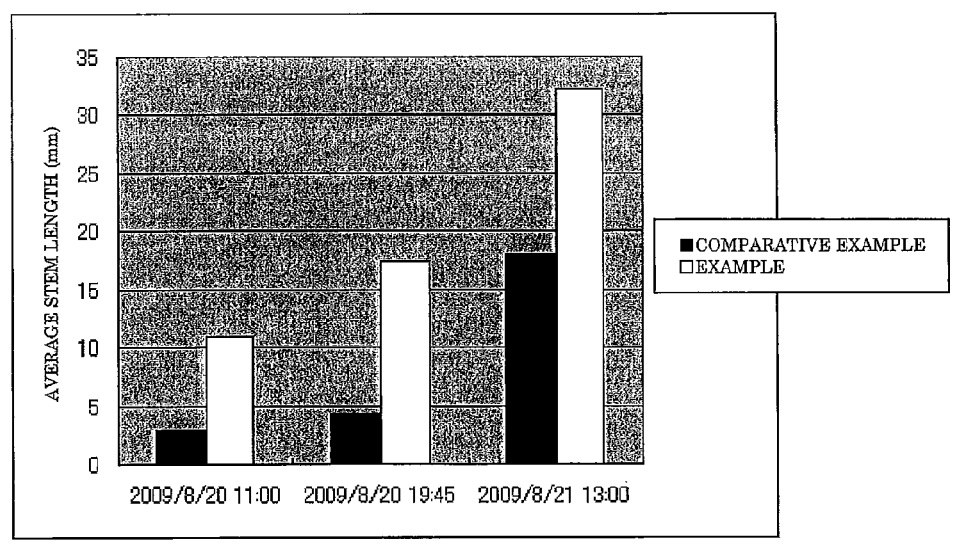
FIG. 5 is a graph showing results of a plant growing test conducted by using the test apparatus for the plant growing apparatus for producing radish sprouts according to Example 3 of the present invention.

The results thereof were as shown in FIG. 5, and in the case of the example in which voltage was applied, the rate of growth was approximately 1.7 times higher on average, compared with the case of Comparative Example in which no voltage was applied.

REFERENCE SIGNS LIST

1: two-sided attraction structure (display means or dust collecting means), 2: electrostatic chuck portion, 3: dielectric member, 3a, 3b: attraction surface, 4: internal electrode, 4a: positive electrode layer, 4b: negative electrode layer, 5: power supply portion, 6: solar cell, 7: voltage boost circuit, 8: large-capacity capacitor, 9: power switch, 10: set-up place, 11: information, 12: support member, 13: filter paper, 14: duct of ventilation unit, 15: connection cable, P: radish sprout, 20: seedling raising box, 21: protective casing, 22: peripheral wall portion, 23: lid member.

The invention claimed is:

1. A two-sided attraction structure, comprising
an electrostatic chuck portion, and
a power supply portion,
wherein the electrostatic chuck portion comprises a dielectric member in a plate shape, which is made of an insulating material and has a front side and a back side each of which serves as an attraction surface when voltage is applied to an internal electrode, and the internal electrode mounted into the dielectric member,
wherein the power supply portion applies the voltage to the internal electrode of the electrostatic chuck portion,
wherein the power supply portion comprises a solar cell, a voltage boost circuit for boosting power generated by the solar cell, and charging means for storing the power generated by the solar cell, and
wherein the electrostatic chuck portion is formed into a sheet shape or a thin plate shape having a thickness ranging from 0.2 to 3 mm.

2. A two-sided attraction structure according to claim 1, wherein the dielectric member of the electrostatic chuck portion is made of a synthetic resin and/or a ceramic.

3. A two-sided attraction structure according to claim 1, wherein the dielectric member of the electrostatic chuck portion is formed into a flexible resin sheet made of a synthetic resin.

4. An exhibition/information apparatus, comprising
display means for exhibition/information formed by employing the two-sided attraction structure according to any one of claims 1 to 3.

5. A dust collecting apparatus, comprising
dust collecting means formed by employing the two-sided attraction structure according to any one of claims 1 to 3,
wherein the dust collecting means comprises a sheet of filter paper that can be attached/detached to/from the attraction surface of the electrostatic chuck portion by turning ON/OFF the power supply portion of the two-sided attraction structure.

6. A plant growing apparatus, comprising
a protective casing which comprises a lid member for covering a plant from above and a peripheral wall portion for surrounding the plant, and
electric stimulation means for applying, by means of an electric field from the electrostatic chuck portion, an electric stimulus to a plant when the voltage is applied, the electric stimulation means being formed by employing the two-sided attraction structure according to any one of claims 1 to 3, and being attracted onto an inner surface side of the lid member of the protective casing,
wherein the peripheral wall portion of the protective casing is adjustable in height.

\* \* \* \* \*